Figure 1:
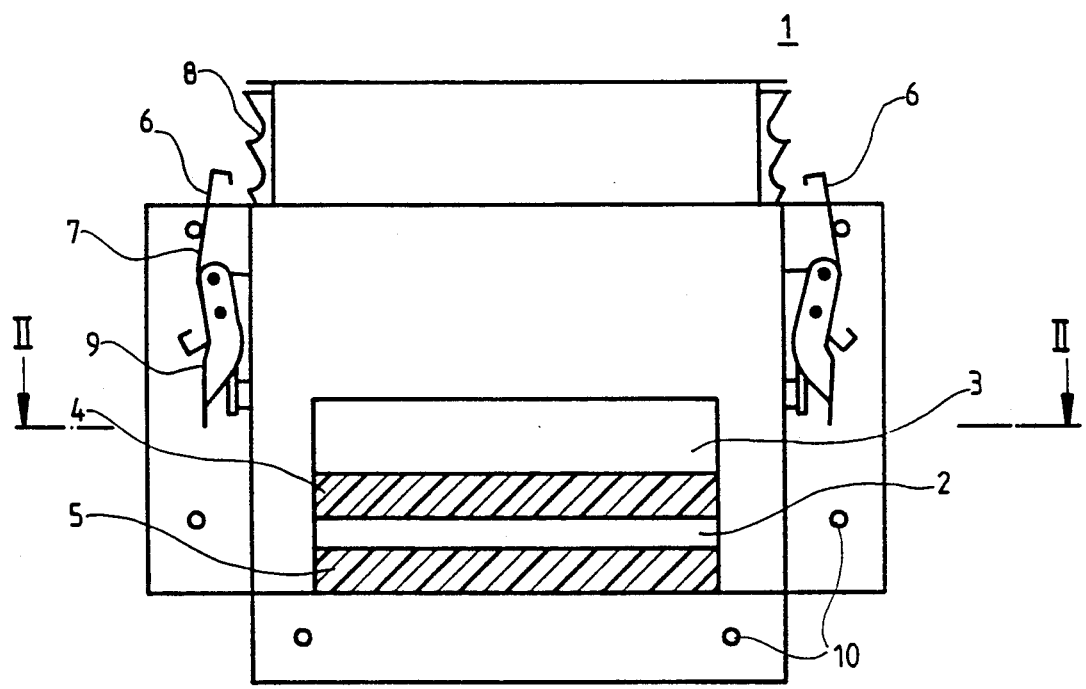

United States Patent [19]

Heidt

[11] Patent Number: 5,184,793
[45] Date of Patent: Feb. 9, 1993

[54] CABLE FEED-THROUGH DEVICE

[75] Inventor: Heinrich Heidt, Neckarsteinach, Fed. Rep. of Germany

[73] Assignee: Heidelberger Druckmaschinen AG, Heidelburg, Fed. Rep. of Germany

[21] Appl. No.: 808,901

[22] Filed: Dec. 17, 1991

[30] Foreign Application Priority Data

Dec. 17, 1990 [DE] Fed. Rep. of Germany ....... 4040379

[51] Int. Cl.$^5$ ................................................ F16L 5/00
[52] U.S. Cl. .................................. 248/56; 174/153 G
[58] Field of Search ................ 248/56, 49, 68.1, 74.1, 248/74.3; 174/153 G, 67, 48, 155, 151; 52/232

[56] References Cited

U.S. PATENT DOCUMENTS

| 2,909,740 | 10/1959 | Seidel | 174/151 X |
|---|---|---|---|
| 3,830,954 | 8/1974 | Caudill | 248/56 X |
| 4,249,353 | 2/1981 | Berry | 174/151 X |
| 4,382,570 | 5/1983 | Craig | 248/74.3 |
| 4,517,408 | 5/1985 | Pegram | 174/153 G |
| 4,688,747 | 8/1987 | Helmsdorfer | 248/56 |
| 4,702,444 | 10/1987 | Beele | 174/151 X |

FOREIGN PATENT DOCUMENTS

| 2505628 | 8/1975 | Fed. Rep. of Germany ..... 248/74.1 |
|---|---|---|
| 7732586 | 5/1978 | Fed. Rep. of Germany . |
| 2754697 | 7/1978 | Fed. Rep. of Germany ..... 248/74.1 |
| 2916448 | 3/1989 | Fed. Rep. of Germany . |
| 9005870 | 5/1990 | World Int. Prop. O. ......... 248/74.3 |

Primary Examiner—J. Franklin Foss
Attorney, Agent, or Firm—Herbert L. Lerner; Laurence A. Greenberg

[57] ABSTRACT

A device for feeding at least one cable through a wall formed with an opening, includes a lockable slide member slidable across the opening for variably reducing the size thereof, and a pair of lips formed of elastic material and located at respective opposite sides of the opening, at least one of the lips being in contact with the slide member.

8 Claims, 2 Drawing Sheets

CABLE FEED-THROUGH DEVICE

The invention relates to a device for feeding cables, especially flat cables, through a wall.

It has become known heretofore to use devices for feeding or passing cables through walls which are formed with openings corresponding to the size of the cables and, if necessary or desirable, have sealing means in order to provide protection against dust and water. With such cable feed-through devices, the plug provided at the end of the cable has to be removed from the cable in order to permit the cable to be inserted, the cable then has to be passed through the opening and, thereafter, the plug has to be reconnected to the cable. The number and the size of the respective openings must correspond to those of the cables which are used.

It is accordingly an object of the invention to provide a device for feeding cables, especially flat cables, through a wall, which permits insertion of a cable without having to remove the plug connected at the end thereof and which may be used for a previously undetermined number of cables, and which is hermetically sealable.

With the foregoing and other objects in view, there is provided, in accordance with the invention, a device for feeding at least one cable through a wall formed with an opening, comprising a lockable slide member slideable across the opening for variably reducing the size thereof, and a pair of lips formed of elastic material and located at respective opposite sides of the opening, at least one of the lips being in contact with the slide member.

The device according to the invention is relatively simple to construct and inexpensive to manufacture. Its universal applicability is in that a previously undetermined number of cables may be inserted or passed therethrough and, especially, flat cables may thus be laid in a relatively simple manner. By means of the device according to the invention, a bundle of flat cables or several bundles of flat cables laid on top of one another may be led through a wall. The device according to the invention may, however, also be used for round or circular cables which may thus be fed through a wall in a dust-tight and water-tight manner. It is not necessary to remove the plugs at the ends of the cables because, by sliding the slide member open, it is possible to pass the plugs through the opening of the device according to the invention and to easily close the opening with the slide member, afterwards. An additional advantage of the invention is that the cables are clamped between the lips, thereby relieving the cables of traction stresses or tensile loading.

In accordance with another feature of the invention, the opening is substantially rectangular, and at least part of the device is insertable into the opening. Accordingly, the respective walls need to be provided only with openings into which the respective cable feed-through device according to the invention are at least partly insertable.

In accordance with a further feature of the invention, the material of the lips has such elasticity that the material is elastically deformable so as to close the opening about a cable extending through the opening.

In accordance with an alternate feature of the invention, the material of the lips has such elasticity that the material is elastically deformable so as to close the opening about a plurality of cables extending through the opening. Thus, for example, the width of an inserted flat cable does not have to correspond to the width of the opening, because, a dust-tight and water-tight sealing is produced, nevertheless. Due to the fact that the lips have a sufficient elasticity range, it is also possible to insert round or circular cables, without negatively affecting the sealing effect.

In accordance with an added feature of the invention, the slide member and the lips are disposed in a plane substantially perpendicularly to a longitudinal axis of the opening for adjusting the cross-sectional dimensions thereof. Bundles of very thick cables which are narrower than the opening of the device may thereby be inserted, without producing any gaps because the gaps are closed by the sliding member and the lips.

In accordance with an additional feature of the invention, at least part of the device is formed of plastic material. Such a construction is relatively inexpensive and meets many requirements.

In accordance with an alternate feature of the invention, at least part of the device is formed of metal. To construct the device according to the invention out of metal provides it with great stability and offers the additional advantage of high-frequency sealing.

In accordance with a concomitant feature of the invention, there is provided a spring locking device for locking the slide member in a selected position. The slide member may, in fact, be locked in various ways. A slide member which may be locked by means of a spring-braced snap mechanism has the added advantage of relatively easy manual operability.

Other features which are considered as characteristic for the invention are set forth in the appended claims.

Although the invention is illustrated and described herein as embodied in a cable feed-through device, it is nevertheless not intended to be limited to the details shown, since various modifications and structural changes may be made therein without departing from the spirit of the invention and within the scope and range of equivalents of the claims.

Figure 2:
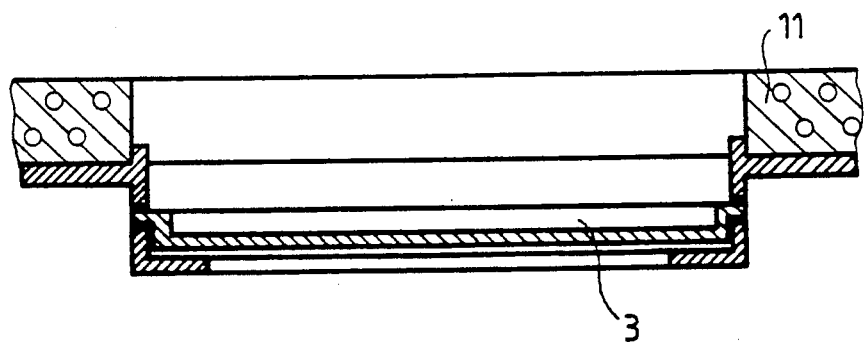

The construction and method of operation of the invention, however, together with additional objects and advantages thereof will be best understood from the following description of specific embodiments when read in connection with the accompanying drawings, in which:

FIG. 1 is a diagrammatic top plan view of the cable feed-through device according to the invention; and FIG. 2 is a cross-sectional view of FIG. 1 taken along the line II—II in the direction of the arrows, and inverted.

Referring now to the drawings, there is shown therein an insertable device 1 constructed so that it may be inserted into a rectangular opening of a wall 11 where it may be fastened by means of screws 10. The device 1 is formed with an opening 2 which is able to be closed by a lockable channel-shaped slide member 3. Two lips 4 and 5 formed of elastic material such as foam rubber, for example, are provided, respectively, at the lower edge of the opening 2, as viewed in FIG. 1, and at the slide member 3 so that, by displacing the slide member 3, the lips 4 and 5 are able to be moved towards one another until the rectangular opening 2 is closed. For the purpose of inserting cables having plugs at the ends thereof, the slide member 3 is slid upwardly, as viewed in FIG. 1, so as to widen the opening 2. The cables, together with their plugs, are then passed through the widened opening 2, and thereafter the slide member 3 is pressed against the cables, the cables being held fast due to the elasticity of the lips 4 and 5. Portions of the opening 2 which would otherwise remain open when cables having a width which does not correspond to the width of the entire opening 2 are passed through the wall are also tightly sealed by the elastic lips 4 and 5. In this condition, the slide member 3 is tightly held by a locking device which may be formed, for example, of spring-braced snap mechanisms 6 having a leaf spring 7 which is engageable with a respective strip 8 having hook-like projections and, thereafter, a lever 9 may be actuated so as to thus tension the leaf spring 7. With such a locking device, the lips 4 and 5 must, of course, be sufficiently elastic to afford, in any locking position, a complete sealing of the opening 2, while the inserted cables are securely clamped.

I claim:

1. Device for feeding a flat cable having a plug attached to an end thereof through a wall formed with an opening, comprising a lockable slide member slideable from one location to other locations across the opening for variably reducing the size thereof, and a pair of lips formed of elastic material and located at respective opposite sides of the opening, at least one of said lips being in contact with said slide member and, at least in said one location of said slide member, being spaced a distance greater than the thickness of the plug from the other of said lips.

2. Device according to claim 1, wherein the opening is substantially rectangular, and at least part of the device is insertable into the opening.

3. Device according to claim 1, wherein the material of said lips has such elasticity that the material is elastically deformable so as to close the opening about a cable extending through the opening.

4. Device according to claim 1, wherein said slide member and said lips are disposed in a plane substantially perpendicularly to a longitudinal axis of the opening for adjusting the cross-sectional dimensions thereof.

5. Device according to claim 1, wherein at least part of the device is formed of plastic material.

6. Device according to claim 1, wherein at least part of the device is formed of metal.

7. Device according to claim 1, including a spring locking device for locking said slide member in a selected position.

8. Device according to claim 1, wherein the material of said lips has such elasticity that the material is elastically deformable so as to close the opening about a plurality of cables extending through the opening.

* * * * *